March 17, 1953        H. M. TIMM        2,631,373

PARTIAL DENTURE

Filed Dec. 27, 1948        3 Sheets-Sheet 1

INVENTOR.
HERMAN M. TIMM

BY Cook and Schermerhorn

ATTORNEYS

March 17, 1953 H. M. TIMM 2,631,373
PARTIAL DENTURE

Filed Dec. 27, 1948 3 Sheets-Sheet 2

INVENTOR.
HERMAN M. TIMM
BY
Cook and Schermerhorn
ATTORNEYS

March 17, 1953 H. M. TIMM 2,631,373
PARTIAL DENTURE

Filed Dec. 27, 1948 3 Sheets-Sheet 3

INVENTOR.
HERMAN M. TIMM
BY
Cook and Schermerhorn
ATTORNEYS

Patented Mar. 17, 1953

2,631,373

UNITED STATES PATENT OFFICE 2,631,373

PARTIAL DENTURE

Herman M. Timm, Portland, Oreg.

Application December 27, 1948, Serial No. 67,305

7 Claims. (Cl. 32—5)

1

This invention relates to removable artificial partial dentures and is particularly concerned with an improved mode of construction thereof.

A primary object of the invention is to provide an improved means of attaching said partial denture to the anchoring natural teeth whereby torsion and decay of the natural tooth is avoided.

Another object of the invention is to provide occlusal rest means for supporting said partial denture on adjacent natural teeth whereby the stress of mastication is borne by several teeth and minimum stress is borne by the gum tissue underneath the saddle portion of the partial denture.

Still another object of the invention is to provide a partial denture of improved construction for use with buccally protruding teeth to facilitate clearance of the overhanging crown of said buccally protruding teeth upon placement and removal of the denture.

Yet another object of the invention is to provide improved means for removably anchoring the saddle of a partial denture to one or more natural teeth.

A further object of the invention is to provide a partial denture having new and improved means for retaining the denture, and permitting easy insertion and removal by the patient without stress or strain on the natural teeth.

The above and still further objects and advantages of the invention will become apparent from a study of the following specification, taken in connection with the accompanying drawings, wherein.

Figure 9:
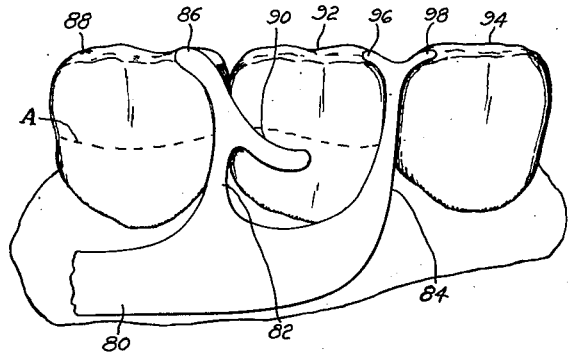
Figure 10:
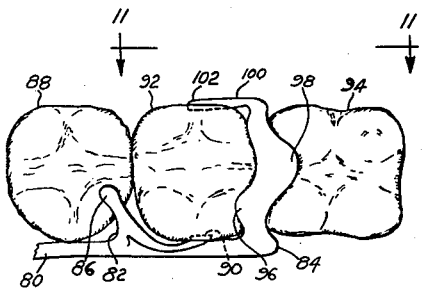
Figure 11:
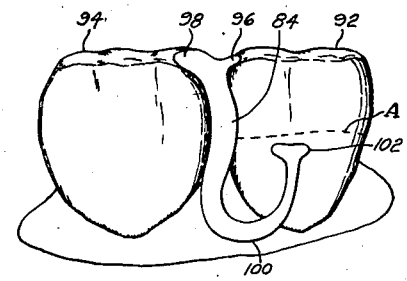

2 views, respectively, showing a modification of the invention for use with buccally protruding teeth;

Figures 9 and 10 are buccal and lingual side elevation views showing a modification of the invention for attachment of one end of a lingual bar to natural teeth; and Figure 11 is a top plan view of the modification shown in Figures 9 and 10.

Figure 1:
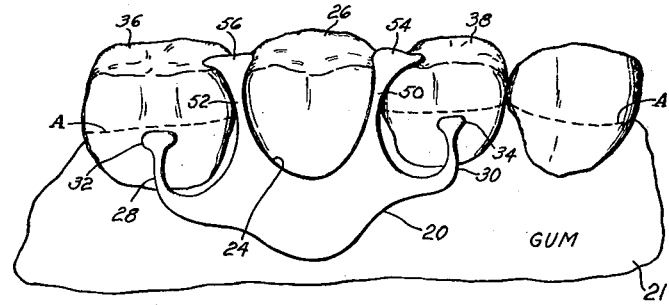
Figure 1 is a perspective view at a slight angle to the horizon, showing the buccal side of an improved partial denture as supported by the natural teeth.
Figure 2:
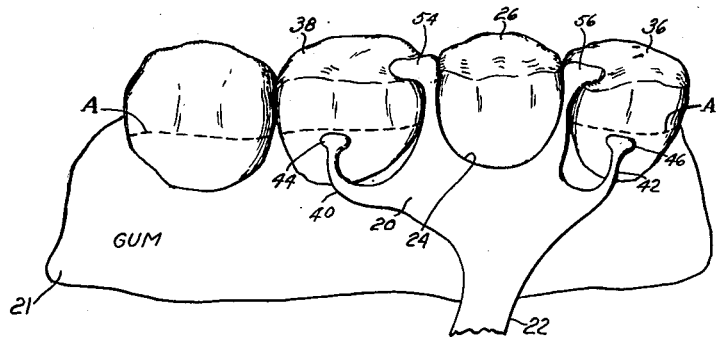
Figure 2 is a view corresponding to Figure 1 showing the lingual side of the same denture.

Referring to the drawings, it will be seen in Figures 1 and 2 that the invention comprises a denture base 20 of more or less conventional design supported by a lingual or palatal bar 22 connecting the denture to another denture base or to natural teeth on the opposite gum and constituting a support in contact with either the gum contour in the case of the lower jaw or the roof of the mouth in the case of the upper jaw, as illustrated in Figures 1 and 2. The denture base comprises a socket for receiving an artificial tooth in the portion of the jaw from which the natural tooth has been removed, and one or more arms attached to said denture base for anchoring the same to the natural teeth by means of resilient engagement with the buccal and lingual surfaces, herein referred to collectively as lateral surfaces, of adjacent, natural teeth. The invention contemplates as an alternative feature, which may be employed either by itself or in combination with the resilient arms just mentioned, one or more arms having their free ends terminating in occlusal rests for seating engagement with areas in the occlusal surfaces of adjacent natural teeth which are out of abutting engagement with the corresponding occlusal surface of mating teeth on the opposite jaw, as graphically illustrated in Figures 5 and 6, in order that said adjacent natural teeth will support the stress load imposed vertically on the artificial tooth and denture during chewing, and thereby exert a minimum stress on the soft gum tissue beneath the saddles of the partial denture.

Considering the drawings in detail, there is shown in Figure 1 the buccal side of a denture base 20 having a socket 24 in which is mounted an artificial tooth 26, and having a pair of resilient arms 28 and 30 terminating in enlarged pad portions 32 and 34 at their free ends for engagement with the buccal surfaces of natural teeth 36 and 38. The pad portions 32 and 34 engage the teeth between the gum line and the surveyor's line (designated by dotted line A) corresponding to the equator or circumference delimited by the greatest diameter of the tooth.

The pads preferably engage the natural teeth just below the surveyor's line in the case of the lower teeth and just above the surveyor's line in the case of upper teeth, and are preferably disposed substantially centrally of the mesial (toward the front of the mouth) and distal (toward the back of the mouth) surfaces of the bicuspids, cuspids and incisor teeth, and engaging the mesial or distal, buccal or lingual lobes of molar teeth. The mesial and distal surfaces are collectively referred to herein as longitudinal surfaces, because of their disposition with reference to the longitude of the gum line.

A substantially corresponding construction of the denture is shown on the lingual side of the gum in Figure 2 where it will be noticed that a corresponding pair of resilient arms 40 and 42 have their free ends terminating in pad portions 44 and 46 disposed in engagement with the lingual surfaces of natural teeth 38 and 36 in substantial opposition to the arms 30 and 28, respectively, on the buccal side. The resilient arms 28, 30, 40, and 42 are preferably constructed with sufficient curvature such that a considerable length of arm is provided to give the necessary resiliency for springing the arm over the point of greatest diameter of the tooth during placement and removal of the denture and for maintaining tension on the anchoring teeth 36 and 38 while the denture is in place. As a part of the general objective of the invention, the resilient arms are constructed and positioned so that only the pad portions are in contact with the anchoring teeth. By virtue of the construction thus described, the denture is retained in position by opposed engagement of the contact pads with the buccal and lingual surfaces gingivally of the line of greatest diameter of the tooth. In this manner, a vise-like grip is provided with a minimum of contact between the metal of the denture and the surface area of the anchor teeth, thereby reducing to a minimum decay caused by such contacting engagement. If decay does develop, the area is small and can be easily repaired, whereas in the dentures of conventional design, having tight-fitting clasps for engaging the circumference of a natural tooth adjacent the gum line, decay is more readily induced, and, when it forms, embraces substantially the entire side of a tooth and may much more readily cause the loss of the entire tooth. It should also be observed that by virtue of the design of denture construction just described, the torsional grip on the anchor tooth, caused by close-fitting conventional engaging clasps is eliminated, thus avoiding the tendency to pry and twist the anchor teeth out of their sockets, the abrasion caused by such torsion in conventional mountings, and the pain and discomfort attributable to such torsional stress on the anchor tooth.

Figure 4:
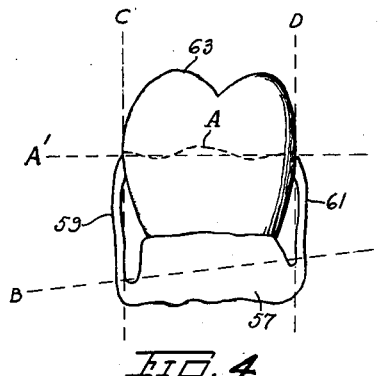
Figure 3:
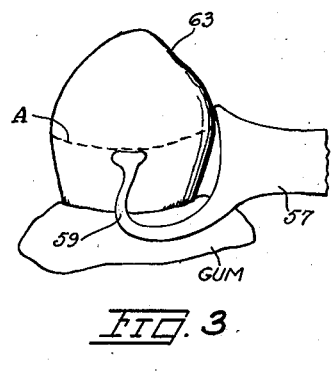
Figure 3 illustrates a buccal or lingual elevation, and Figure 4 a mesial or distal elevation of tooth surfaces showing the detail of the resilient arm construction in engagement with an anchoring natural tooth.

Figures 3 and 4 illustrate in further detail a denture base portion 57 and resilient arms 59 and 61 showing how the arms 59 and 61 engage natural tooth 63 below the surveyor's line A on opposite sides of the tooth.

There is also shown in Figure 1 the socket portion 24 formed with a pair of upwardly extending relatively rigid arms or standards 50 and 52 on the mesial and distal sides of the artificial tooth 26 having their free ends terminating in flattened, flange-like lateral extensions 54 and 56 constituting occlusal rests having seating engagement with corresponding depressions or recesses in the occlusal surfaces of the mesially and distally adjoining natural teeth 38 and 36, respectively. It is desired to point out in this connection that the occlusal rests are placed, in accordance with the invention, as hereinbefore previously pointed out with reference to Figures 5 and 6, on occlusal surface area portions which are out of abutting engagement with the corresponding occlusal surfaces of mating teeth on the opposite jaw or on surfaces which are not opposed by mating teeth. In this manner of construction, interference between the occlusal rests and the occlusal surfaces of mating teeth is avoided without resorting to the expedient of grinding depressions or recesses in natural teeth to receive occlusal rests as heretofore customary in the prior art. In the illustration of Figures 1 and 2, the occlusal surface areas on which the rests 54 and 56 are seated were sufficiently high (in the case of the upper jaw) to be out of abutting engagement with the corresponding occlusal surface of the mating teeth on the opposite jaw by a sufficient distance to allow for the interposition of the rests 54 and 56 without introducing interference. If such recesses or depressions had not been provided naturally, the occlusal rests 54 and 56 would not have been placed in the positions illustrated, but would have been attached to arms on the lingual bar positioned so as to engage the occlusal surface of either adjoining or adjacent teeth on area portions which were out of registering abutting engagement with the mating teeth, as illustrated in Figures 5 and 6 or 9, 10 and 11.

Figure 5:
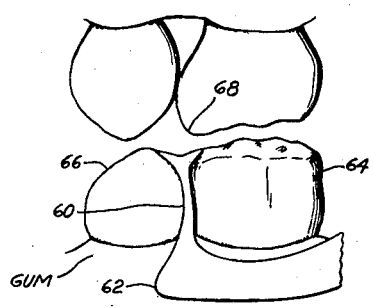
Figure 5 is a detail elevation view of lateral surfaces of upper and lower registering teeth showing the positioning of the occlusal rest and its supporting arm in an interproximal space.
Figure 6:
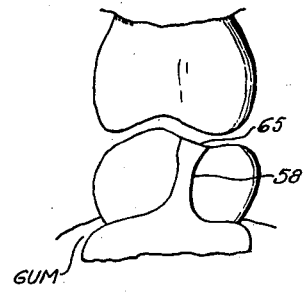
Figure 6 is a detail elevation view showing the occlusal rest with its supporting arm positioned with respect to a longitudinal surface of an isolated or an end tooth.

The occlusal rests may be fashioned on the ends of more or less rigid arms comprising upward extensions of the denture base as shown in Figures 1 and 2, or they may also be fashioned from relatively thin resilient arms or finger standards where appropriate to the dental structure as illustrated by arm 58 in Figure 6. The occlusal rests may be placed at any point on the periphery of the occlusal surface, either buccally, lingually, mesially, or distally of any tooth or teeth. All that is necessary is that the point or points be chosen where the mating or opposing tooth or teeth do not touch. The arm or finger standard supporting the occlusal rest is preferably placed buccally or lingually in the interproximal spaces (between the teeth), thus being out of the way of the tongue and cheek muscles. The latter disposition of the finger arm is illustrated in Figure 5 where a finger standard 60 is attached to a portion of a denture base 62 and extends vertically from the denture base and is disposed in the interproximal space between an adjoining tooth 64 and an adjacent tooth 66 with a forked occlusal rest having one prong of the fork engaging tooth 64 and the other prong engaging tooth 66. Although not illustrated in end elevation, the finger arm 60 is constructed advantageously of relatively thin cross section because the stress to be opposed by this arm is a tension stress caused by pressure transmitted to the denture base by chewing, and rigidity against deflection is, therefore, unnecessary. Figure 5 further illustrates one mode of shaping the occlusal rest to avoid not only interference with the opposing, mating teeth, but actually to provide a complementary grinding surface abutting engagement with the lobe 68 of the opposing tooth. The modification of the occlusal rest 65 and its supporting arm 58 shown in Figure 6 illustrates a case where the denture base engages a distal portion of the gum on the distal side of the last molar, or where the denture base adjoins a longitudinal side of an isolated tooth. The principle of disposing the occlusal rest so as to be out of registering abutting engagement with the occlusal surface of the opposing tooth is again illustrated in this figure. A further variation in occlusal rests is described in connection with Figures 9 to 11.

Figures 7, 8:
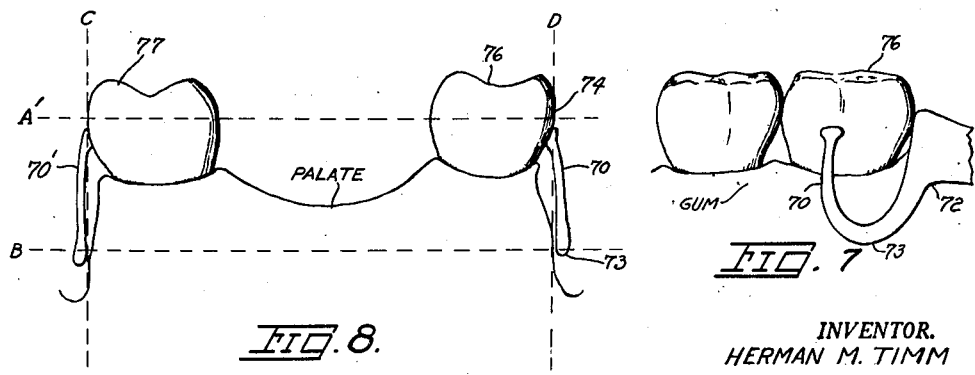
Figures 7 and 8 are side and end elevation

The invention is particularly useful for cases presenting substantial protrusion of teeth, wherein the resilient arm 70 may be constructed as shown in Figures 7 and 8 with its point of juncture 72 with the base sufficiently high on the gum tissue of upper teeth, and sufficiently low on the gum tissue of lower teeth, and having a curvature 73 such that clearance of the overhanging crown 74 of the tooth 76 is readily facilitated during vertical movement in placement and removal of the denture. The shape that the arm 70 takes, as seen in end elevation in Figure 8, is any part of a segment of a circle or modification thereof to provide an arc of sufficient radius to clear the protrusion or overhang of the natural tooth during placing or removal of the denture. The geometry of the construction is graphically depicted by the dotted reference lines A', B, C and D applied to Figure 8. Line A' passes through the points of greatest diameter of the protruding teeth 76 and 77. Lines C and D are parallel lines normal to lines A' and B and intersect line A' at points tangent to the curved buccal surfaces of the teeth. Line B represents the high point of projection of the denture on the upper gum or the low point of projection on the lower gum. It will be seen that the distance between arms 70 and 70' at their free ends near line A' is less than the distance between lines C and D. The free ends of resilient arms 70 and 70' readily spring outwardly to enable clearance of the points of greatest diameter of the teeth during placement and removal of the denture. However, the points of juncture 72 with the denture base near the line B (being less resilient and almost inflexible) are originally constructed so as to be spaced apart a distance slightly greater than the distance between lines C and D, as will appear from Figure 8, in order to enable placement and removal of the denture. The same principle of construction is employed with normally disposed teeth, as illustrated in Figure 4, wherein the lines C and D are parallel, although line B, representing the point of juncture of the arms 59 and 61 with the dental base structure 57, is tilted with respect to line A' to illustrate conformation of line B to different levels of denture formation on the buccal and lingual sides of the gum.

An advantage of the application of the invention disclosed in Figures 7 and 8 which cannot be obtained by the use of the tight fitting clasp connections of the prior art is that a clasp connection fitted in close contact about a substantial portion of the circumference of the tooth adjacent the gum line will not permit of vertical displacement over a buccally protruding tooth.

Figures 9, 10 and 11 show the novel features of the invention adapted for use in anchoring the free end of a palatal or lingual bar to natural teeth on the side of the mouth opposite the location of the denture saddle (not shown). In Figure 9, the lingual bar 80 will be seen to be provided with two vertically extending resilient arms 82 and 84. The first arm 82 illustrates a modification whereby it may be provided with a forked free end, one fork 86 providing an occlusal rest for engagement with tooth 88 and the other fork 90 extending downwardly for engagement below the surveyor's line A with adjacent tooth 92. The other arm 84 extends upwardly and across natural teeth 92 and 94, being shaped to provide occlusal rests 96 and 98 in occlusal engagement with both teeth. Thereupon, the arm extends downwardly as shown in Figure 10, in the interproximal space between teeth 92 and 94, its free end curving upwardly at 100 to terminate in pad portion 102 engaging tooth 92 on its buccal side below the surveyor's line at a point substantially opposite the engagement of the fork 90 on the lingual side of said tooth. It will readily be understood that the principle of the invention disclosed in Figures 9, 10, 11, for attaching a free end of a lingual or palatal bar to natural teeth, may also be employed at points intermediate the ends of the bar. Other variations and various combinations embodying the principles of the invention represented by the resilient arms for retaining the denture against withdrawal and the finger arms for maintaining the occlusal rests in supported seating engagement with the occlusal surface of the teeth will readily occur to persons skilled in the art.

It will now be appreciated that there has been disclosed a novel construction for a partial denture which is simple in design, may be cast in one piece, and presents a pleasing appearance; which provides improved stability in response to the various stresses to which the denture may be subjected in chewing; which is comfortable to wear; and which reduces to a minimum the causes of decay attributable to denture work. An incidental but important advantage is that the natural teeth do not have to be prepared and ground in any way preparatory for receiving the denture except as may be necessary when required by existing causes already present in the teeth such as breaks or decay. The denture construction of the invention is practically self-cleansing because of the minimum of contact between the denture attachment and the natural teeth. The stress of chewing is distributed over several teeth and is distributed uniformly over the entire denture.

It is to be understood that the language and expressions which have been employed are used as terms of description only and not of limitation, and that the invention is not limited to the exact details of construction shown and described, for changes and modifications will readily occur to persons skilled in the art. The expression "a denture base for an artificial tooth" as used in the claims is to be construed as including a partial denture with one or more artificial teeth.

What is claimed is:

1. A partial denture construction comprising a denture base for an artificial tooth, a pair of resilient arms attached to said denture base oppositely disposed on the buccal and lingual sides of said denture and having their free ends terminating in integrally formed pad portions for engagement with the buccal and lingual sides of an adjacent natural tooth substantially at but just inwardly of the surveyor's line of said tooth, said pair of resilient arms extending longitudinally along but out of contact with the surfaces of said adjacnt natural tooth except at the pad portions, and a third arm attached to said denture base having its free end terminating in an occlusal rest for engagement with a portion of the occlusal surface area of an adjacent natural tooth.

2. A partial denture construction comprising a denture base for an artificial tooth for use with a buccally protruding natural tooth, a resilient arm attached to said denture base and having a free end extending longitudinally of said natural tooth and terminating in a pad portion, the juncture of said arm with the denture base being below the gum line, said arm being curved laterally of the gum tissue sufficiently to enable clearance of the overhanging crown of said buccally protruding tooth during placement and removal of said denture.

3. In a partial denture construction having a lingual bar, means for removably attaching said bar to natural teeth comprising a pair of resilient arms extending longitudinally of said teeth and having their free end portions terminating in pad portions oppositely disposed on the buccal and lingual sides of a natural tooth and between the gum line and surveyor's line of said natural tooth but nearer the surveyor's line than to the gum line, with said arms being out of contact with the surfaces of the natural tooth except at the pad portions.

4. In a partial denture construction having a lingual bar, means for removably attaching said bar to a natural tooth comprising a resilient arm attached to said bar and having its free end terminating in a pad portion for engagement with the lingual side of said natural tooth between the gum line and the surveyor's line thereof, and a second resilient arm attached to said bar for engagement between the interproximal spaces of said natural tooth and an adjoining natural tooth and providing occlusal rests in registry with depressions in said adjoining natural teeth, the free end of said second arm terminating in a pad portion resiliently bearing against said first mentioned natural tooth in opposition to the pad portion of said first arm.

5. In a partial denture having a denture base and an occlusal rest, a curved resilient arm attached to said denture base having a free end terminating in a pad portion for pressure engagement with a lateral surface of a natural tooth intermediate the gum line and the surveyor's line of said tooth and constituting the sole point of contact of said denture with said natural tooth, the free end of said arm extending in a direction longitudinally of said natural tooth.

6. A partial denture construction comprising a denture base for an artificial tooth, a pair of resilient arms extending from said denture base below the gum line toward the buccal and lingual sides of an adjacent natural tooth, and free end portions on said arms extending longitudinally of said natural tooth and engaging said natural tooth between the gum line and surveyor's line.

7. In a partial denture having a denture base and an occlusal rest, means for securing said base to a natural tooth comprising a curved resilient arm on said base extending toward said natural tooth at a point below the gum line and having a free end portion extending longitudinally of said tooth and terminating in a pad portion positioned to engage said tooth between the gum line and surveyor's line of the tooth, said pad portion constituting the sole point of contact between said arm and said tooth.

HERMAN M. TIMM.

REFERENCES CITED

The following references are of record in the file of this patent:

UNITED STATES PATENTS

| Number | Name | Date |
|---|---|---|
| 1,425,844 | Engberg | Aug. 15, 1922 |
| 1,426,935 | Wiechert | Aug. 22, 1922 |
| 1,819,296 | Kunde | Aug. 18, 1931 |
| 2,036,678 | Blake | Apr. 7, 1936 |

FOREIGN PATENTS

| Number | Country | Date |
|---|---|---|
| 556,005 | Great Britain | Sept. 16, 1943 |